(12) United States Patent
Sharma et al.

(10) Patent No.: US 11,689,578 B2
(45) Date of Patent: Jun. 27, 2023

(54) SYSTEM AND METHOD FOR EMBEDDING EXTERNAL INFRASTRUCTURE SERVICES INTO MANAGEMENT NODES

(71) Applicant: VMWARE, INC., Palo Alto, CA (US)

(72) Inventors: Dinesh Sharma, Bangalore (IN); Ammar Rizvi, Bangalore (IN); Akash Kodenkiri, Bangalore (IN); Sachin Johri, Bangalore (IN); Sachin Motegowda, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 127 days.

(21) Appl. No.: 16/716,543

(22) Filed: Dec. 17, 2019

(65) Prior Publication Data

US 2020/0236146 A1 Jul. 23, 2020

Related U.S. Application Data

(63) Continuation of application No. 16/375,855, filed on Apr. 5, 2019, now Pat. No. 11,038,926.

(30) Foreign Application Priority Data

Jan. 23, 2019 (IN) .............................. 201941002762
Oct. 14, 2019 (IN) .............................. 201943041478

(51) Int. Cl.
*H04L 9/40* (2022.01)
*H04L 41/28* (2022.01)
*H04L 41/12* (2022.01)

(52) U.S. Cl.
CPC ............ *H04L 63/205* (2013.01); *H04L 41/12* (2013.01); *H04L 41/28* (2013.01); *H04L 63/164* (2013.01)

(58) Field of Classification Search
CPC ....... H04L 63/205; H04L 41/12; H04L 41/28; H04L 63/164
See application file for complete search history.

(56) References Cited

U.S. PATENT DOCUMENTS

| | | | | |
|---|---|---|---|---|
| 8,769,531 | B2* | 7/2014 | Anderson | G06F 9/5077 718/1 |
| 9,218,196 | B2* | 12/2015 | Boss | G06F 9/4862 |
| 9,350,681 | B1* | 5/2016 | Kitagawa | H04L 41/12 |
| 10,462,009 | B1* | 10/2019 | Shiramshetti | H04L 41/12 |
| 2013/0254847 | A1* | 9/2013 | Adams | G06F 21/6218 726/4 |
| 2016/0188425 | A1* | 6/2016 | Duggana | G06F 11/203 714/4.11 |
| 2018/0159745 | A1* | 6/2018 | Byers | H04L 41/122 |
| 2019/0102157 | A1* | 4/2019 | Caldato | G06F 9/547 |

* cited by examiner

*Primary Examiner* — Trang T Doan (57) ABSTRACT

In one example, a management node and an infrastructure node external to the management node may be identified in a cloud computing environment. The management node may execute a centralized management service and the external infrastructure node may execute a first infrastructure service that handles at least one infrastructure network function for the centralized management service. Further, a second infrastructure service may be deployed on the management node. Data in the first infrastructure service may be replicated to the second infrastructure service. Furthermore, the centralized management service in the management node may be repointed to the second infrastructure service such that the second infrastructure service is to operate within the management node.

15 Claims, 7 Drawing Sheets

SYSTEM AND METHOD FOR EMBEDDING EXTERNAL INFRASTRUCTURE SERVICES INTO MANAGEMENT NODES

CROSS-REFERENCES TO RELATED APPLICATIONS

This application is a Continuation-in-part of patent application Ser. No. 16/375,855 entitled "SYSTEM AND METHOD FOR EMBEDDING INFRASTRUCTURE SECURITY SERVICES INTO MANAGEMENT NODES", filed on Apr. 5, 2019, which claims the benefit under 35 U.S.C. 119(a)-(d) to Indian Non-Provisional Application number 201941002762 entitled "SYSTEM AND METHOD FOR EMBEDDING INFRASTRUCTURE SECURITY SERVICES INTO MANAGEMENT NODES" filed on Jan. 23, 2019, and Indian Patent of Addition Application number 201943041478 entitled "SYSTEM AND METHOD FOR EMBEDDING EXTERNAL INFRASTRUCTURE SERVICES INTO MANAGEMENT NODES" filed on Oct. 14, 2019, by VMware, Inc., which is herein incorporated in its entirety by reference for all purposes.

TECHNICAL FIELD

The present disclosure relates to cloud computing environments, and more particularly to methods, techniques, and systems for embedding an external infrastructure service into a management node in the cloud computing environments.

BACKGROUND

In cloud computing environments, various centralized management services may exist to manage virtual machines and physical servers centrally in virtual computing environments. Virtual-machine technology may abstract the hardware resources and interfaces of a computer system on behalf of one or multiple virtual machines, each comprising one or more application programs and an operating system. The recent emergence of cloud computing services can provide abstract interfaces to enormous collections of geographically dispersed data centers, allowing computational service providers to develop and deploy complex Internet-based services that execute on tens or hundreds of physical servers through abstract cloud-computing interfaces. In such cloud computing environments, a cluster of management nodes running management services may be communicatively coupled together and act as a single platform for managing the virtualization infrastructure and deploying virtual machines. For example, two or more nodes may be grouped together provided that the functionality of the management nodes, as a whole, is able to act as a single platform for managing the virtualization infrastructure.

The drawings described herein are for illustration purposes only and are not intended to limit the scope of the present subject matter in any way.

DETAILED DESCRIPTION

Examples described herein may provide an enhanced computer-based and network-based method, technique, and system for embedding an external infrastructure service into a management node in a cloud computing environment (e.g., a customer production environment). The management node may execute centralized management services that may be interconnected to manage virtual machines (VMs) and physical servers centrally in virtual computing environments. In some systems with distributed management, the host computing systems may be statically allocated among the management nodes.

Further, infrastructure services, such as a platform services controller (PSC) or federated Single Sign-On (SSO), may be connected to the management node and provide various infrastructure functionalities for the centralized management services. Example infrastructure functionality may include Single Sign-On, licensing, certificate management, server reservation, and the like. In such cases, users may have to determine a number of infrastructure nodes, the management nodes with the kind of connectivity with the infrastructure nodes, and topology (e.g., an infrastructure service to another infrastructure service replication) to be deployed for users' requirement. Thus, different users may have different numbers and combinations of the infrastructure nodes and the management nodes deployment.

Further, the users may prefer one product (e.g., enterprise software) to manage their host computing systems. However, with the above configuration flexibility of having separate infrastructure nodes, a configuration/reconfiguration overhead may be introduced. Also, in such cases, users may have to separately manage additional nodes (e.g., VMs) that runs the infrastructure security services, which can be onerous to users (e.g. virtual infrastructure (VI) administrators) as the users may have to:

manage additional VMs executing the infrastructure services,     manage extra configurations associated with, for instance, load balancers, multi-site architecture, or the like,     handle additional interoperability with connected products,     handle additional lifecycle consideration for deployment, upgrade, rollback, and the like, and/or     strategize backup and restoration of the infrastructure nodes.

In some examples such as vCenter® embedded linked mode architecture (VELMA) (e.g., offered by VMware), the infrastructure services (e.g., PSC) may be replicated between the embedded nodes. However, VELMA configuration may be available to newer deployments. In some example environments, where external infrastructure nodes are deployed (e.g., vCenter with external PSCs), it may be challenging to generate an embedded node with embedded infrastructure services. Further, any configuration change may be time consuming and may affect downtime in production environment.

Examples described herein may provide a convergence utility to embed an external infrastructure service into a management node to convert the management node into an embedded node in a cloud computing environment. In one example, the convergence utility may identify a management node and an infrastructure node external to the management node in the cloud computing environment. The management node may execute a centralized management service and the external infrastructure node may execute a first infrastructure service that handles at least one infrastructure network function for the centralized management service. Further, the convergence utility may deploy a second infrastructure service on the management node, replicate data in the first infrastructure service to the second infrastructure service, and repoint the centralized management service in the management node to the second infrastructure service such that the second infrastructure service is to operate within the management node. Upon repointing the centralized management service in the management node to the second infrastructure service, the infrastructure node may be decommissioned. Thus, examples described herein may eliminate the overhead generated by configuration/reconfiguration of the external infrastructure node.

System Overview and Examples of Operation

Figure 1A:
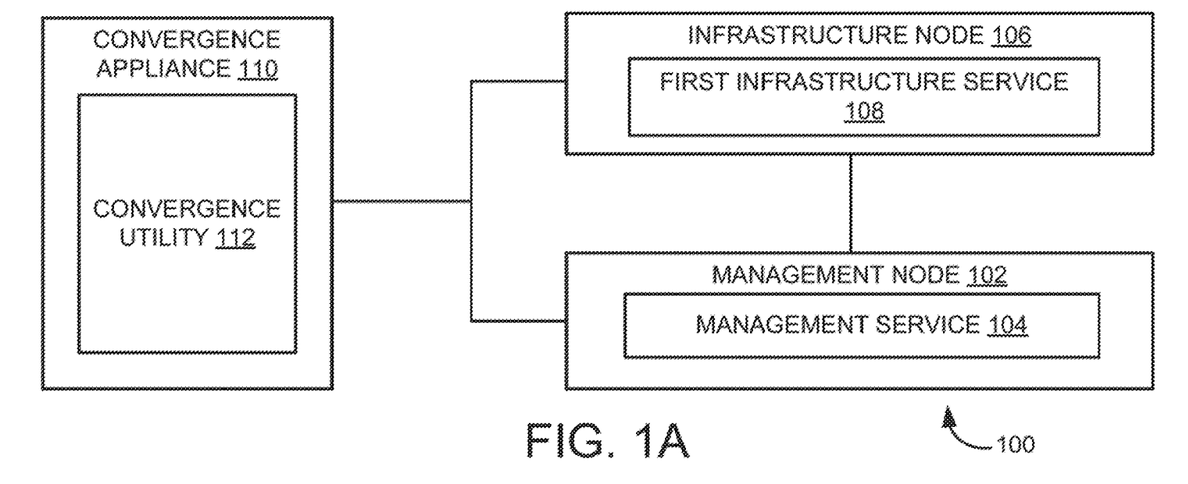
FIG. 1A is a block diagram of an example cloud computing environment, including a convergence utility to embed an external infrastructure service into a management node.

FIG. 1A is a block diagram of an example cloud computing environment 100, including a convergence utility 112 to embed an external infrastructure service (e.g., a first infrastructure service 108) into a management node 102. Example cloud computing environment 100 may be VMware vSphere®. Cloud computing environment 100 (e.g., a virtualized cloud computing environment) may include one or more computing platforms that support the creation, deployment, and management of virtual machine-based cloud applications. One such platform is the vCloud® Automation Center, which is commercially available from VMware.

As shown in FIG. 1A, cloud computing environment 100 may include management node 102 executing a centralized management service 104. Centralized management service 104 may be a centralized management application to centrally manage virtual machines and physical servers in cloud computing environment 100. Example centralized management service 104 may be a part of vCenter Server™ and vSphere® program products, which are commercially available from VMware. Example centralized management service 104 may include virtual machine provisioning service (e.g., to guide and automate the provisioning of virtual machines and their resources), resources and virtual machine inventory management service (e.g., to organize virtual machines and resources in the virtual environment and facilitates their management), alarms and event management service (e.g., to track and warn users on potential resource overuse or event conditions), and the like.

Further, cloud computing environment 100 may include an infrastructure node 106 externally connected to management node 102. In one example, each of infrastructure node 106 and management node 102 may be selected from a group consisting of a physical host computing system, a virtual machine, and a container. In the example shown in FIG. 1A, infrastructure node 106 may be connected to management node 102, however, cloud computing environment 100 may include any number of infrastructure security nodes and management nodes in any configuration.

Further, infrastructure node 106 may execute first infrastructure service 108 to handle at least one infrastructure function such as Single Sign-On (SSO), license management, certificate management, active directory federation service, external identity management service, and server reservation for centralized management service 104. For example, first infrastructure service 108 may include the license management function, which may deliver centralized license management and reporting functionality to management services in the production environment.

As shown in FIG. 1A, cloud computing environment 100 may include a convergence appliance 110 communicatively coupled to management node 102 and infrastructure node 106 via a network. Example network can be a managed Internet protocol (IP) network administered by a service provider. For example, the network may be implemented using wireless protocols and technologies, such as WiFi, WiMax, and the like. In other examples, the network can also be a packet-switched network such as a local area network, wide area network, metropolitan area network, Internet network, or other similar type of network environment. In yet other examples, the network may be a fixed wireless network, a wireless local area network (LAN), a wireless wide area network (WAN), a personal area network (PAN), a virtual private network (VPN), intranet or other suitable network system and includes equipment for receiving and transmitting signals.

Figure 1B:
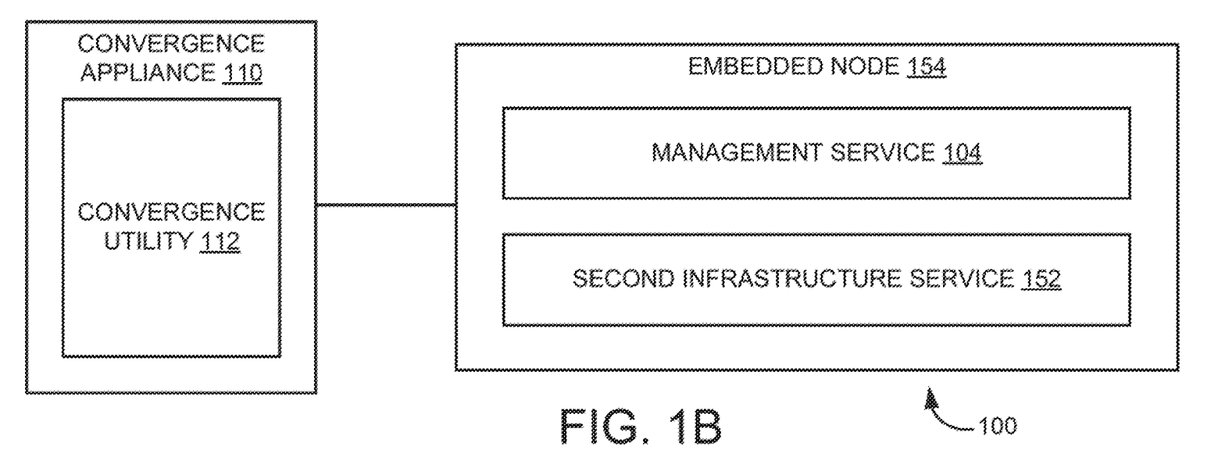
FIG. 1B is a block diagram of the example cloud computing environment of FIG. 1A, depicting an embedded node with an embedded infrastructure service.

Further, convergence appliance 110 may include convergence utility 112 to embed first infrastructure service 108 into management node 102 to form an embedded node (e.g., an embedded node 154 of FIG. 1B). In one example, convergence utility 112 may be a command line interface (CLI) based and converges one management node to one embedded node in one go.

During operation, convergence utility 112 may identify management node 102 and associated infrastructure node 106 external to management node 102. In one example, convergence utility 112 may identify management node 102 and infrastructure node 106 in response to receiving a request to combine external infrastructure node 106 and management node 102. Further, convergence utility 112 may deploy a second infrastructure service (e.g., second infrastructure service 152 as shown in FIG. 1B) on management node 102. In one example, convergence utility 112 may deploy infrastructure service binaries with an installation package on management node 102 and configure the second infrastructure service on management node 102 with the deployed infrastructure service binaries.

Further in operation, convergence utility 112 may set the second infrastructure service on management node 102 in a replication mode with first infrastructure service 108 on infrastructure node 106. Furthermore, convergence utility 112 may replicate data in first infrastructure service 108 to the second infrastructure service. Further, convergence utility 112 may repoint management node 102 to the second infrastructure service such that the second infrastructure service is to operate within management node 102 upon replicating the data to the second infrastructure service. In one example, repointing management node 102 to second infrastructure service 152 may include repointing centralized management service 104 in management node 102 to second infrastructure service 152.

Further, convergence utility 112 may decommission infrastructure node 106 upon repointing centralized management service 104 in management node 102 to the second infrastructure service. Thus, users may not have to separately manage additional infrastructure node 106 (e.g., VM) that runs external infrastructure service 108.

FIG. 1B is a block diagram of example cloud computing environment 100 of FIG. 1, depicting an embedded node 154 with an embedded infrastructure service (i.e., second infrastructure service 152). For example, similarly named elements of FIG. 1B may be similar in structure and/or function to elements described with respect to FIG. 1A. As shown in FIG. 1B, cloud computing environment 100 depicts embedded node 154 including second infrastructure service 152. In one example, convergence utility 112 may repoint centralized management service 104 in management node 102 to second infrastructure service 152 to convert management node 102 (e.g., as shown in FIG. 1A) into embedded node 154 with embedded infrastructure service 152.

In the examples described herein, the infrastructure service binary payload may be significantly smaller. Thus, deploying the infrastructure service binaries on management node 102 may not consume significant time. Also, since replication feature is utilized for replicating data from first infrastructure service 108 (e.g., as shown in FIG. 1A) to second infrastructure service 152, downtime for converting management node 102 to embedded node 154 may be significantly reduced. In addition, no downtime may be required for significantly larger setup as other nodes in the configuration continue working while one management node gets converted to corresponding embedded node. Also, examples described herein may utilize user certificates present on management node 102 and no additional certificate may be required, which can reduce cost associated with the additional certificate.

In some examples, the functionalities described herein, in relation to instructions to implement functions of convergence utility 112, and any additional instructions described herein in relation to the storage medium, may be implemented as engines or modules comprising any combination of hardware and programming to implement the functionalities of the modules or engines described herein. The functions of convergence utility 112 may also be implemented by a respective processor. In examples described herein, the processor may include, for example, one processor or multiple processors included in a single device or distributed across multiple devices. In some examples, convergence utility 112 can be a part of management software (e.g., vSphere® virtual center that is offered by VMware®) residing in management node 102.

Figure 2A:
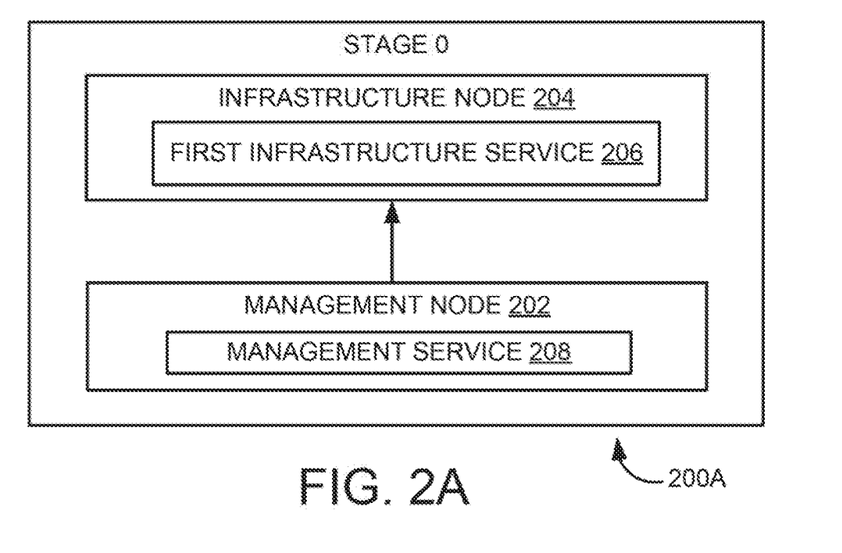
FIGS. 2A-2E illustrate example sequence diagrams, illustrating embedding an external infrastructure service into a management node to form an embedded node.
Figure 2B:
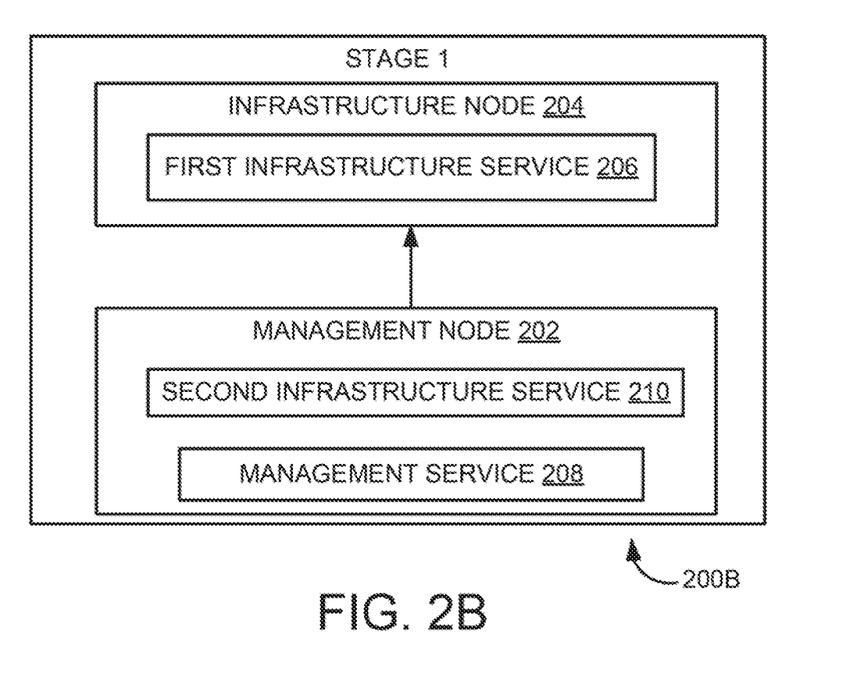
Figure 2C:
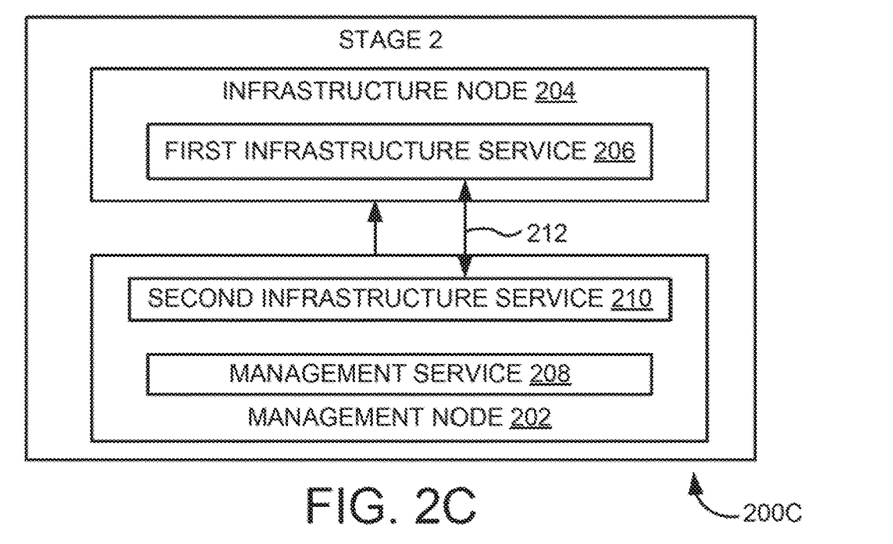
Figure 2D:
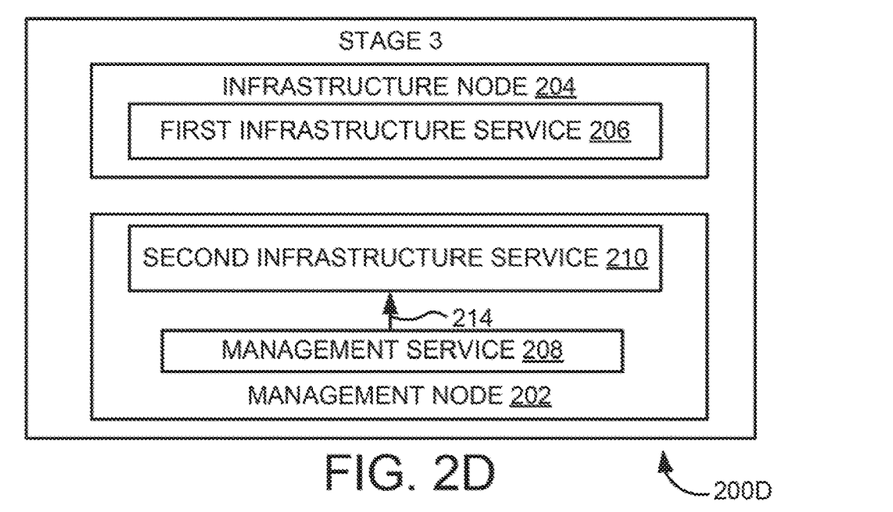
Figure 2E:
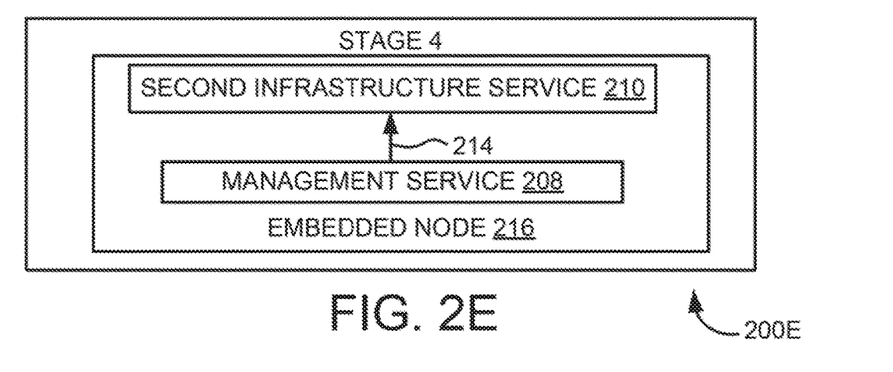

FIGS. 2A-2E illustrate example sequence diagrams 200A-200E, respectively, illustrating embedding an infrastructure service (e.g., a first infrastructure service 206) into a management node 202 to form an embedded node 216. First infrastructure service 206 may be running on an infrastructure node 204 and externally connected to management node 202. Further, management service 208 may be running on management node 202. A convergence utility (e.g., 112 as shown in FIG. 1A) may be used to convert management node 202 with external first infrastructure service 206 (e.g., as shown in FIG. 2A) to embedded node 216 with an embedded infrastructure service 210 (e.g., as shown in FIG. 2E).

As shown in FIG. 2A, stage 0 may represent management node 202 connected to external infrastructure node 204 including first infrastructure service 206. Further, the convergence utility may execute an operation on management node 202 to deploy second infrastructure service 210 on management node 202 as shown in FIG. 2B. As shown in FIG. 2B, stage 1 depicts management node 202 configured with second infrastructure service 210.

As shown in FIG. 2C, stage 2 depicts replicating data (e.g., as shown by arrow 212) in first infrastructure service 206 to second infrastructure service 210. As shown in FIG. 2D, stage 3 depicts repointing (e.g., as shown by arrow 214) management service 208 in management node 202 to second infrastructure service 210 such that second infrastructure service 210 may operate within management node 202. With management node 202 in a cloud computing system now participating in the embedded mode, external infrastructure node 204 can be decommissioned. As shown in FIG. 2E, stage 4 depicts a change in the node type from management node 202 to embedded node 216. In this example, embedded node 216 represents management node 202 with embedded infrastructure service 210.

Figure 3A:
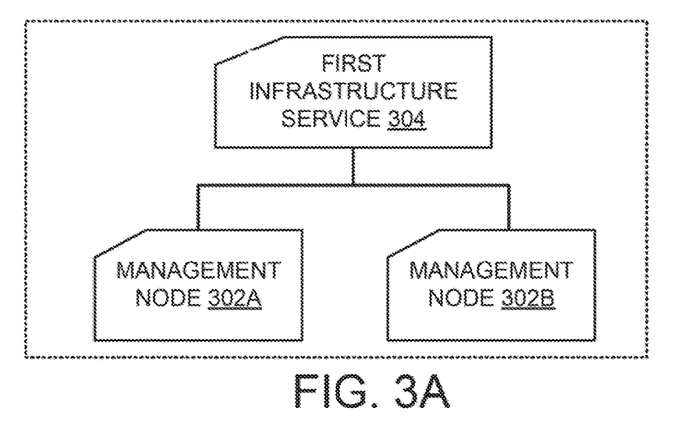
FIGS. 3A-3F illustrate other example sequence diagrams, illustrating embedding an external infrastructure service into multiple management nodes by a convergence utility tool.
Figure 3B:
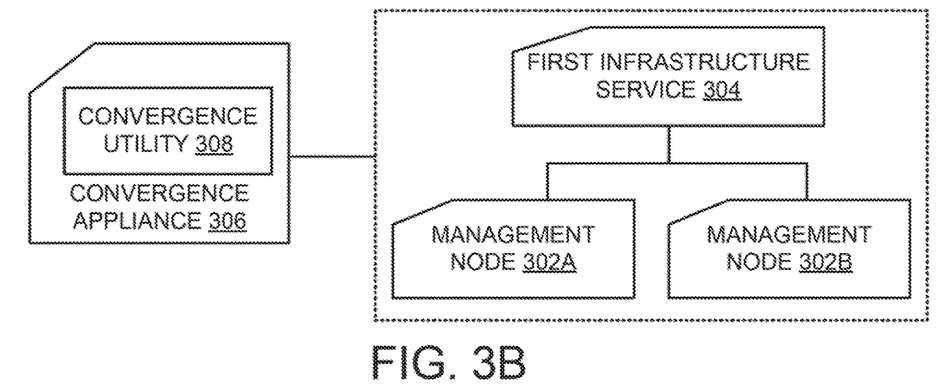

FIGS. 3A-3F illustrate other example sequence diagrams, illustrating embedding an external infrastructure service (i.e., a first infrastructure service 304) into management nodes 302A and 302B by a convergence utility 308. As shown in FIG. 3A, management nodes 302A and 302B may be provided with external first infrastructure service 304. Further, upon receiving a request to convert management nodes 302A and 302B with external first infrastructure service 304 to management nodes 302A and 302B with an embedded infrastructure service, convergence utility 308 executing on a convergence appliance 306 may be deployed in a customer production environment (e.g., as shown in FIG. 3B).

Figure 3C:
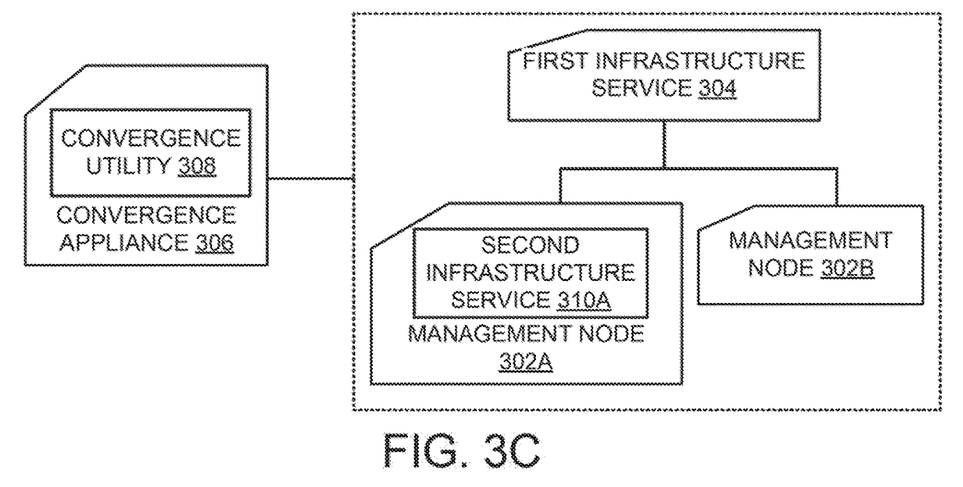
Figure 3D:
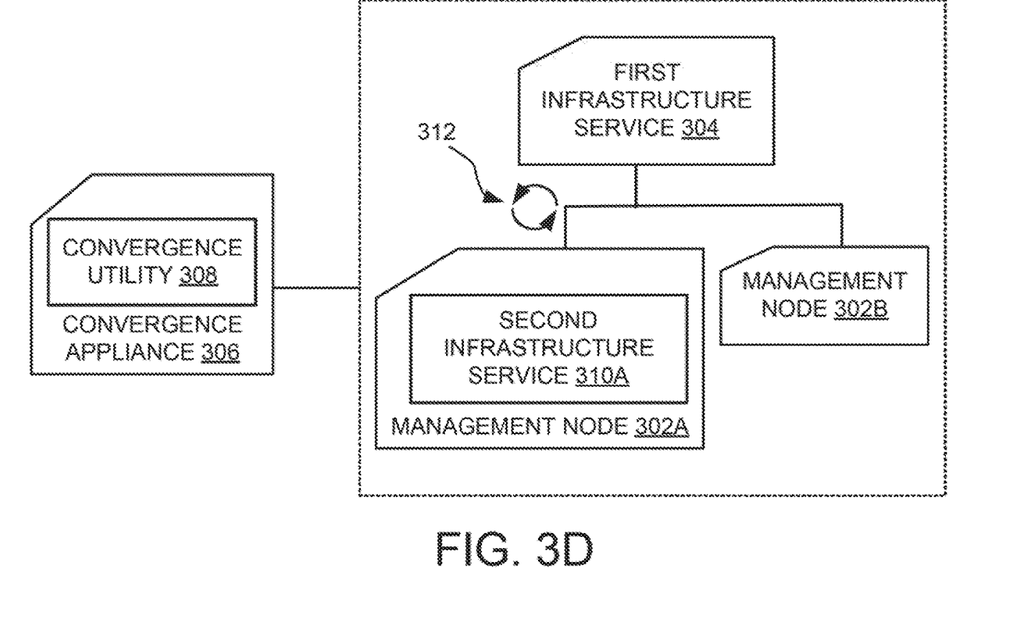
Figure 3E:
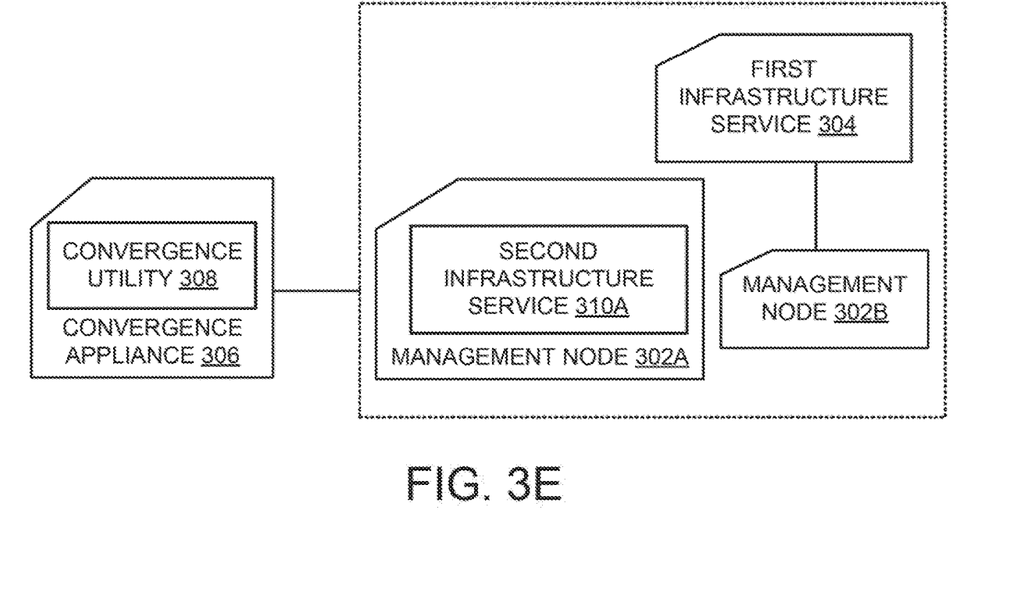

In one example, convergence utility 308 may identify management node 302A and deploy second infrastructure service 310A on management node 302A (e.g., as shown in FIG. 3C). Further, convergence utility 308 may replicate data in first infrastructure service 304 to second infrastructure service 310A as shown by arrow 312 in FIG. 3D. Upon replication, convergence utility 308 may repoint a management service in management node 302A to second infrastructure service 310A such that second infrastructure service 310A is to operate within management node 302A as shown in FIG. 3E. Further, convergence utility 308 may determine whether any other management node is connected to first infrastructure service 304. In the example shown in FIGS. 3A-3E, management node 302B is connected to first infrastructure service 304. Similar to deploying second infrastructure service 310A in management node 302A, convergence utility 308 may deploy a third infrastructure service 310B in management node 302B, replicate data in first infrastructure service 304 to third infrastructure service 310B, and then repoint management node 302B to third infrastructure service 310B such that third infrastructure service 310B is to operate within management node 302B.

Figure 3F:
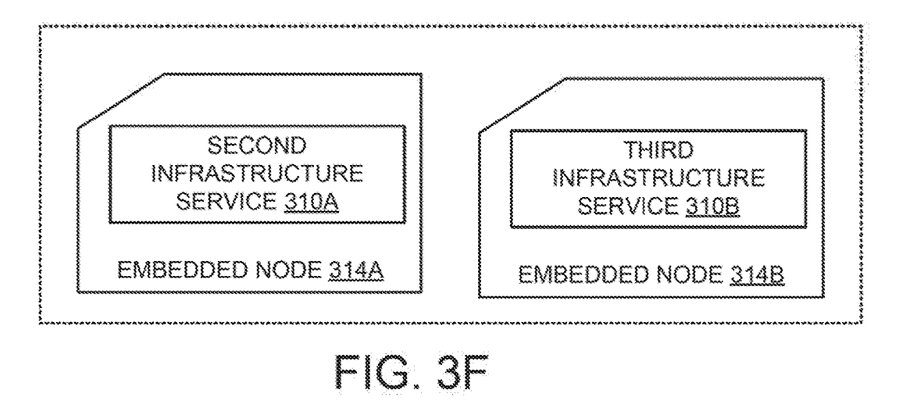

Furthermore, convergence utility 308 may decommission node that runs first infrastructure service 304 upon repointing management node 302B to third infrastructure service 310B and upon determining that no other management node is connected to first infrastructure service 304. FIG. 3F depicts embedded nodes 314A and 314B with an embedded infrastructure services 310A and 310B, respectively, upon decommissioning the node that runs first infrastructure service 304.

Example Processes

Figure 4:
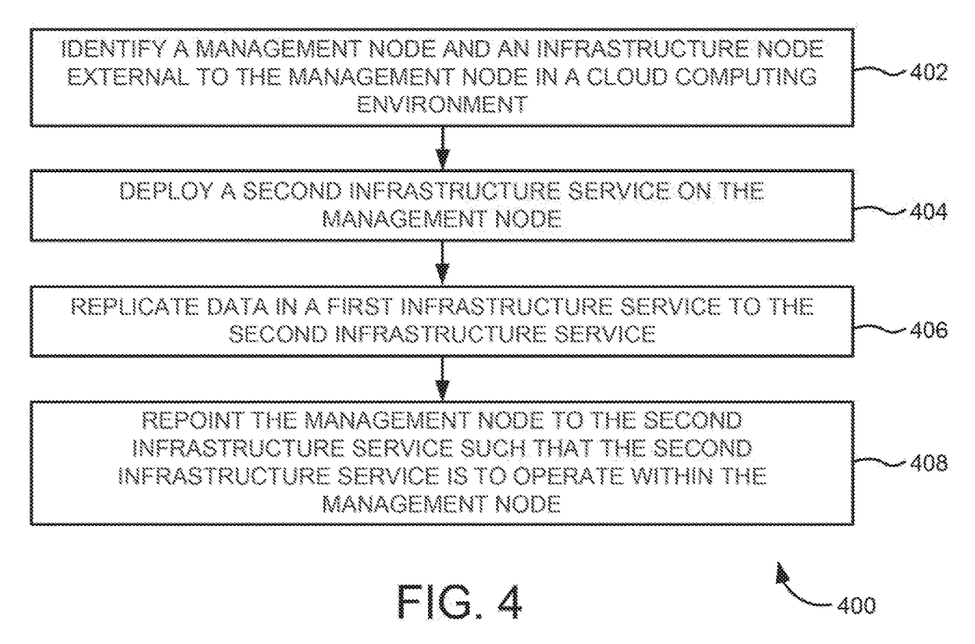
FIG. 4 is an example flow diagram illustrating embedding an external infrastructure service into a management node to form an embedded node with an embedded infrastructure service.

FIG. 4 is an example flow diagram 400 illustrating embedding an infrastructure service into a management node to form an embedded node with an embedded infrastructure service. It should be understood that the process depicted in FIG. 4 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 402, a management node and an infrastructure node external to the management node may be identified in a cloud computing environment. In one example, the management node and the infrastructure node may be identified in response to receiving a request to combine the external infrastructure node and the management node. Example management node may execute a centralized management service and the external infrastructure node may execute a first infrastructure service that handles at least one infrastructure network function for the centralized management service. In one example, the at least one infrastructure network function may be selected from a group consisting of Single Sign-On (SSO), license management, certificate management, active directory federation service, external identity management service, and server reservation, and each centralized management service is a centralized management application to centrally manage virtual machines and physical servers in the cloud computing environment. In one example, the infrastructure node and the management node may be selected from a group consisting of a physical host computing system, a virtual machine, and a container.

At 404, a second infrastructure service may be deployed on the management node. In one example, deploying the second infrastructure service on the management node may include deploying infrastructure service binaries with an installation package on the management node and configuring the second infrastructure service on the management node with the deployed infrastructure service binaries.

At 406, data in the first infrastructure service may be replicated to the second infrastructure service. In one example, replicating data in the first infrastructure service to the second infrastructure service may include setting the second infrastructure service on the management node in a replication mode with the first infrastructure service on the infrastructure node.

At 408, the centralized management service in the management node may be repointed to the second infrastructure service such that the second infrastructure service is to operate within the management node. In one example, repointing the centralized management service in the management node to the second infrastructure service may convert the management node into an embedded node with an embedded infrastructure service. In one example, the infrastructure node may be decommissioned upon repointing the centralized management service in the management node to the second infrastructure service.

Figure 5:
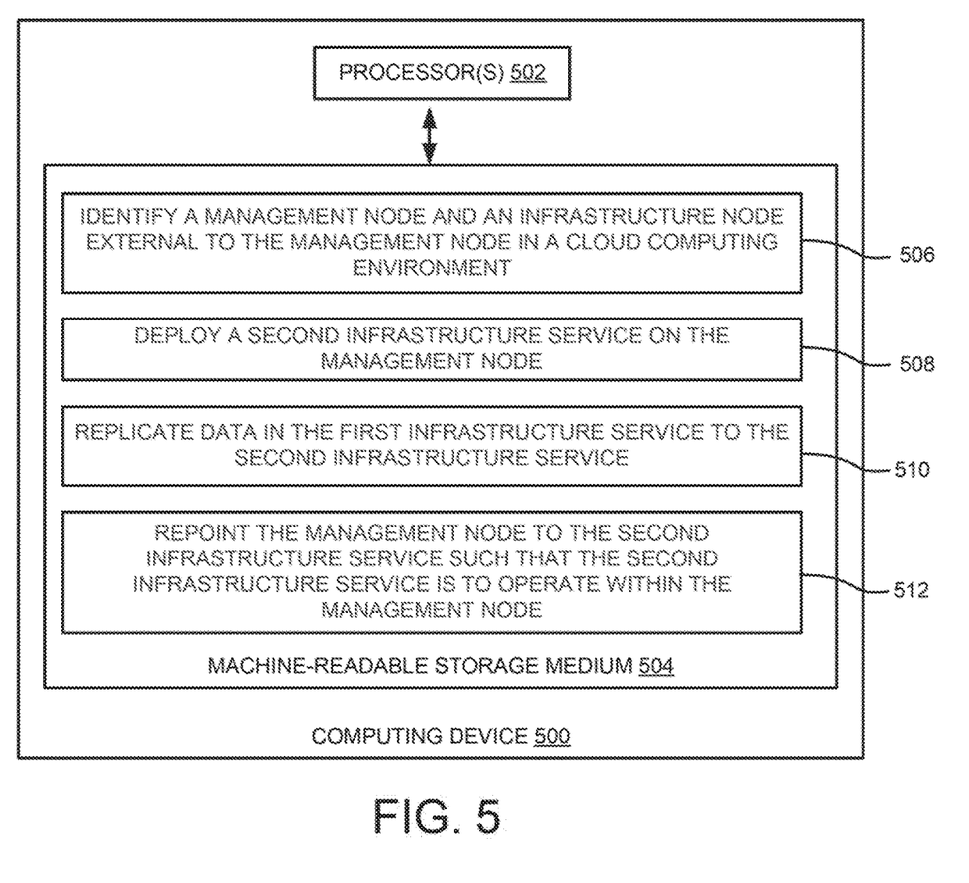
FIG. 5 is a block diagram of an example computing device including non-transitory computer-readable storage medium storing instructions to embed an external infrastructure service into a management node to form an embedded node with an embedded infrastructure service.

FIG. 5 is a block diagram of an example computing device 500 including non-transitory computer-readable storage medium 504 storing instructions to embed an infrastructure service into a management node to form an embedded node with an embedded infrastructure service. Computing device 500 may include a processor 502 and machine-readable storage medium 504 communicatively coupled through a system bus. Processor 502 may be any type of central processing unit (CPU), microprocessor, or processing logic that interprets and executes machine-readable instructions stored in machine-readable storage medium 504. Machine-readable storage medium 504 may be a random-access memory (RAM) or another type of dynamic storage device that may store information and machine-readable instructions that may be executed by processor 502. For example, machine-readable storage medium 504 may be synchronous DRAM (SD RAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 504 may be a non-transitory machine-readable medium. In an example, machine-readable storage medium 504 may be remote but accessible to computing system 500.

Machine-readable storage medium 504 may store instructions 506-512. In an example, instructions 506-512 may be executed by processor 502 for forming the embedded node with the embedded infrastructure service. Instructions 506 may be executed by processor 502 to identify the management node and an infrastructure node external to the management node in a cloud computing environment. In one example, the management node may execute a centralized management service and the external infrastructure node may execute a first infrastructure service that handles at least one infrastructure network function for the centralized management service.

Instructions 508 may be executed by processor 502 to deploy a second infrastructure service on the management node. Instructions 510 may be executed by processor 502 to replicate data in the first infrastructure service to the second infrastructure service. Further, instructions 512 may be executed by processor 502 to repoint the centralized management service in the management node to the second infrastructure service such that the second infrastructure service is to operate within the management node. In one example, upon repointing the centralized management service in the management node to the second infrastructure service, the infrastructure node may be decommissioned.

Examples described in FIGS. 1A-5 can be implemented in vCenter Server™ and vSphere® program products, which are commercially available from VMware. Examples described herein can also be implemented in vRealize Automation®, vRealize Operations, vRealize Business, vCloud Automation Center, and/or the like that are offered by VMware.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
   receiving a request to convert a management node with an external first infrastructure service to the management node with an embedded infrastructure service;
   in response to receiving the request, identifying the management node and an infrastructure node external to the management node in a cloud computing environment, wherein the management node is to execute a centralized management service, wherein the centralized management service is a centralized management application to centrally manage virtual machines and physical servers in the cloud computing environment, and wherein the external infrastructure node is to execute the external first infrastructure service that handles at least one infrastructure security function for the centralized management service;
   deploying a second infrastructure service on the management node;
   replicating data in the external first infrastructure service to the second infrastructure service; and
   converting the management node into an embedded node with the embedded infrastructure service by repointing the centralized management service in the management node to the second infrastructure service such that the second infrastructure service is to operate within the management node.

2. The method of claim 1, further comprising:
   decommissioning the infrastructure node upon repointing the centralized management service in the management node to the second infrastructure service.

3. The method of claim 1, wherein the at least one infrastructure security function is selected from a group consisting of Single Sign-On, license management, certificate management, active directory federation service, external identity management service, and server reservation.

4. The method of claim 1, wherein the infrastructure node and the management node are selected from a group consisting of a physical host computing system, a virtual machine, and a container.

5. The method of claim 1, wherein replicating data in the external first infrastructure service to the second infrastructure service comprises:
   setting the second infrastructure service on the management node in a replication mode with the external first infrastructure service on the infrastructure node.

6. The method of claim 1, wherein deploying the second infrastructure service on the management node comprises:
   deploying infrastructure service binaries with an installation package on the management node; and
   configuring the second infrastructure service on the management node with the deployed infrastructure service binaries.

7. A system comprising:
   a management node executing a centralized management service, wherein the centralized management service is a centralized management application to centrally manage virtual machines and physical servers in a cloud computing environment;
   an infrastructure node externally connected to the management node, the infrastructure node executing an external first infrastructure service that handles at least one infrastructure security function for the centralized management service; and
   a convergence appliance connected to the management node and the infrastructure node, wherein the convergence appliance comprises a processor and memory coupled to the processor, and wherein the memory comprises a convergence utility to:
   receive a request to convert the management node with the external first infrastructure service to the management node with an embedded infrastructure service;
   in response to receiving the request, identify the management node and the associated infrastructure node external to the management node;
   deploy a second infrastructure service on the management node;
   replicate data in the external first infrastructure service to the second infrastructure service; and
   convert the management node into an embedded node with the embedded infrastructure service by repointing the centralized management service in the management node to the second infrastructure service such that the second infrastructure service is to operate within the management node.

8. The system of claim 7, wherein the convergence utility is to:
   decommission the infrastructure node upon repointing the centralized management service in the management node to the second infrastructure service.

9. The system of claim 7, wherein the infrastructure node and the management node are selected from a group consisting of a physical host computing system, a virtual machine, and a container.

10. The system of claim 7, wherein the convergence utility is to:
    set the second infrastructure service on the management node in a replication mode with the external first infrastructure service on the infrastructure node.

11. The system of claim 7, wherein the convergence utility is to:
    deploy infrastructure service binaries with an installation package on the management node; and
    configure the second infrastructure service on the management node with the deployed infrastructure service binaries.

12. A non-transitory machine-readable storage medium encoded with instructions that, when executed by a processor of a computing system, cause the processor to:

receive a request to convert a management node with an external first infrastructure service to the management node with an embedded infrastructure service;

in response to receiving the request, identify the management node and an infrastructure node external to the management node in a cloud computing environment, wherein the management node is to execute a centralized management service, wherein the centralized management service is a centralized management application to centrally manage virtual machines and physical servers in the cloud computing environment, and wherein the external infrastructure node is to execute the external first infrastructure service that handles at least one infrastructure security function for the centralized management service;

deploy a second infrastructure service on the management node;

replicate data in the external first infrastructure service to the second infrastructure service; and convert the management node into an embedded node with the embedded infrastructure service by repointing the centralized management service in the management node to the second infrastructure service such that the second infrastructure service is to operate within the management node.

13. The non-transitory machine-readable storage medium of claim 12, further comprising instructions that, when executed by the processor, cause the processor to:

decommission the infrastructure node upon repointing the centralized management service in the management node to the second infrastructure service.

14. The non-transitory machine-readable storage medium of claim 12, wherein the instructions to replicate data in the external first infrastructure service to the second infrastructure service comprises instructions to:

set the second infrastructure service on the management node in a replication mode with the external first infrastructure service on the infrastructure node.

15. The non-transitory machine-readable storage medium of claim 12, wherein the instructions to deploy the second infrastructure service on the management node comprises instructions to:

deploy infrastructure service binaries with an installation package on the management node; and configure the second infrastructure service on the management node with the deployed infrastructure service binaries.

\* \* \* \* \*